Dec. 10, 1968  J. B. WAGGOTT ET AL  3,414,908
ALIGNMENT DEVICES FOR USE WITH PROSTHESES
Filed Aug. 6, 1965  2 Sheets-Sheet 1
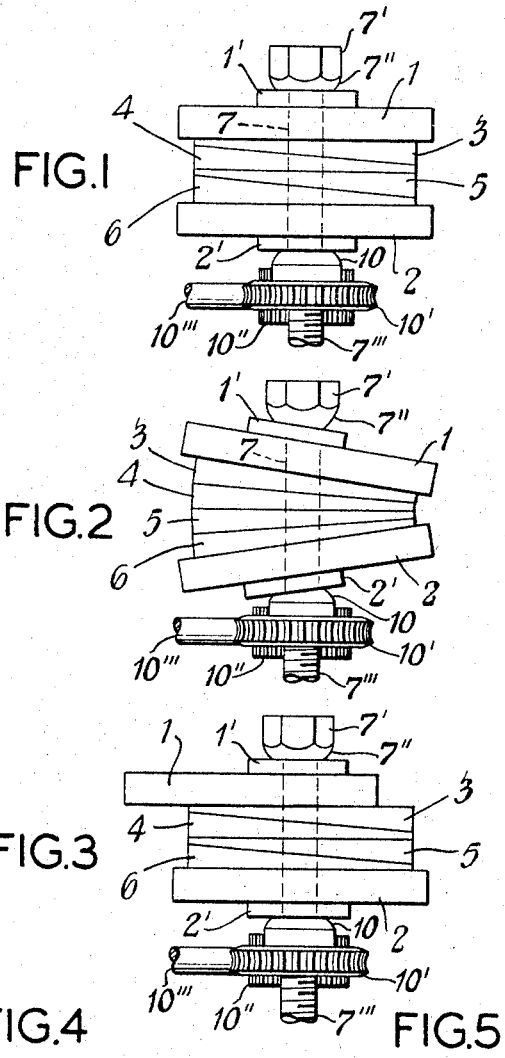
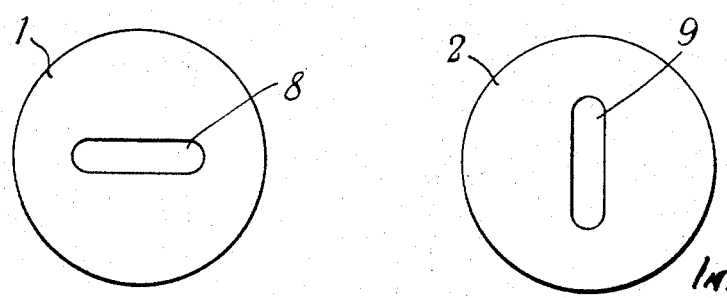
INVENTORS
JOHN B. WAGGOTT &
ALBERT J. S. DADSON United States Patent Office 3,414,908
Patented Dec. 10, 1968

3,414,908
ALIGNMENT DEVICES FOR USE
WITH PROSTHESES
John Berry Waggott, Alton, and Albert J. S. Dadson,
London, England, assignors to Vissa Limited, Alton,
Hampshire, England
Filed Aug. 6, 1965, Ser. No. 477,811
2 Claims. (Cl. 3—1)

ABSTRACT OF THE DISCLOSURE

An alignment device for prostheses in which the angular adjustment of end plates of the device is achieved by the use of ball and socket joints and is maintained by solid spacers made up from a plurality of rotatable and lockable wedge shaped discs embracing a locking rod extending from the ball of the joint.

---

This invention relates to devices for the alignment of a prosthetic limb in relation to the amputee.

In fitting a prosthetic limb to an amputee, adjustments must be made to components for alignment in angular, lateral, rotary, lineal and other geometrical positions that are inter-related in such a manner that in finality, the amputee can simulate the gait movements of a sound normal limb.

An object of the present invention is to provide facilities for adjustment which can be embodied in the prosthetic limb and become a permanent part thereof, so that the alignment will not be disturbed during any subsequent finishing process.

Another object of the invention is to provide for adjustment whilst the prosthetic limb is being worn by the amputee, so that such adjustments can be rapidly made in accordance with the immediate impressions of poise and gait of the amputee without removing or dismantling the limb.

The invention provides an alignment device for a prosthetic limb including a pair of end members slidable relatively to one another in two directions at right angles across the major axis of the limb, means including at least two wedge shaped discs relatively rotatable about that axis to adjust the angularity of at least one end plate relative to the axis and manually operable threaded means to lock the discs in adjusted position.

Preferably the adjustment of the discs is used to tilt at least one end member about a ball and socket joint and the adjusted discs constitute a solid washer interposed between an end member and the main length of the limb.

Alternatively the ball and socket may be omitted and the discs may be directly interposed between end plates, one of which is slidable across the axis of the limb in one direction and the other of which is slidable in a direction at right angles.

The main length of the limb includes telescopically adjustable parts for altering its overall length.

In many cases the limb includes two alignment devices, for example one attachable to a knee joint and one attachable to an ankle joint.

The above and other parts of the invention are embodied in two forms of adjustment device, which will now be described in some detail by way of example with reference to the accompanying drawings in which:

FIG. 1 is a diagrammatic elevation of an alignment device in upright position.

FIG. 2 is a similar view of the device of FIG. 1 shown tilted.

FIG. 3 is a similar view of the device of FIG. 1 shown upright, but with an end plate displaced to one side.

FIG. 4 is a plan view of one end plate of the device.

FIG. 5 is a plan view of the other end plate of the device.

Figure 6:
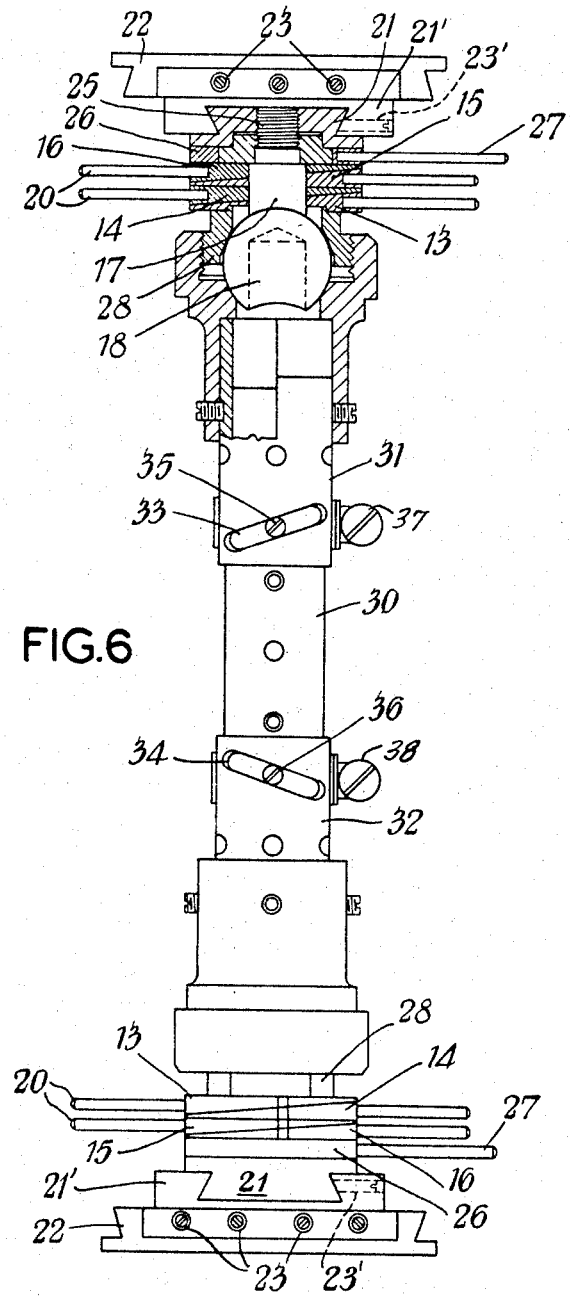
FIG. 6 is a side elevation of a complete limb in part section, showing two alignment devices incorporating ball and socket joints.

Referring first to FIGS. 1 to 3, the device comprises an upper circular end plate 1 having an elongated slot therethrough extending along a diameter of the disc (as shown in FIG. 4) and a similarly formed lower end plate 2 (as shown in FIG. 5).

Between these upper and lower plates are two pairs of wedge-shaped discs, 3, 4 and 5, 6, circular in plan view. Each of these wedge shaped pairs has one flat surface at right angles to the axis of the disc, and its opposite flat surface at an angle to this axis, so that the disc is thinner at one end of a diameter than at the other end. The two discs of each pair are such that when they are arranged with the thinnest edge portion of one disc aligned with the thickest edge portion of the other disc, the axes of the two discs are aligned and the two surfaces at right angles to these axes are parallel. By rotating one disc about its axis relative to the other, whilst maintaining contact between the inclined surfaces, the axes of the discs and therefore the surfaces at right angles to these axes are tilted relatively to one another. The maximum tilt is obtained when the thinnest edge of the discs are aligned as shown in FIG. 2.

By using two pairs of such discs, the maximum desired angle of tilt between the outermost surfaces can be obtained with a relatively small inclination of the inclined face of each disc and adjustment of the plane in which this tilt is effected is made easier.

The assembly of discs is clamped together by a rod 7 passing through the slots 8 and 9 in the upper and lower discs and central holes through the intermediate discs. This rod has a head 7' having a spherical under surface 7" which engages in a spherical recess in a top clamping plate 1' secured to the upper end plate 1. The rod 7 is screw-threaded at its lower end 7''' to receive a spherical headed nut 10 which engages in a spherical recess in a lower clamping plate 2' secured to the lower end plate 2. This nut is integral with a worm wheel 10' which can be rotated by a worm 10'' transverse to the axis of the rod by a tool applied to a squared end 10''' of the worm.

In use, the upper and lower end plates 1 and 2 are rigidly secured to the two parts of the prosthetic limb, whose relative position requires alignment, and the device assembled to approximately the desired position prior to the final adjustment when the prosthetic limb is fitted to the amputee. Anatomical adjustments for medial-lateral or anterior-posterior and rotary positions can then be made by sliding the upper and lower plates (the slots in which are arranged perpendicular to one another) in relation to the rod 7 and by rotating the four intermediate discs 3, 4, 5 and 6 around the rod to alter the tilt. When the adjustments are completed the worm is rotated to clamp the elements together.

In the alignment devices illustrated in FIG. 6 two pairs of wedge shaped discs 13, 14 and 15, 16 are rotatable about a locking rod 17 which extends from a ball 18.

Removable tommy bars 20 are provided to facilitate adjustment of the discs relatively to one another.

End plates 21 and 22 of each device are slidable relatively to each other in two directions at right angles by virtue of the double dovetail joint plate 21' interposed therebetween, the dovetail joints being disposed at right angles, one of which is engaged with the plate 22 and which may be locked up by means of the set screws 23 and the other of which engages the plate 21 at right angles and which may be locked up by means of the set screws 23'.

A threaded end 25 of the locking rod 17 engages in the plate 21 and is itself engaged by a threaded locking disc 26, which is fitted with a removable tommy bar 27.

The locking disc 26 has a small clearance from the plate 21 and a partial turn is sufficient to release it from clamping engagement with the discs 13, 14, 15 and 16.

The threaded socket 28 for the ball 18 is provided with flats for engagement by a suitable spanner and a partial turn is sufficient to permit free relative movement between ball and socket.

The major length of the limb includes a central tubular post or part 30 received telescopically into end tubes 31 and 32.

Slots 33 and 34 in the tubes 31 and 32 engage set screws 35 and 36 inserted in holes in the part 30 and on release of circlips 37 and 38 fine adjustments for length may be made by a relative twisting movement. Major adjustments of length are accommodated by the provision of alternative holes in both the tubes 31 and 32 and in the central tubular part 30.

To make an adjustment (after length adjustment) of tilt and orientation and sideways displacement, the tommy bar 27 is inserted into the locking disc 26 and is used to unscrew disc 26 by a partial rotation. The socket 28 is similarly freed by use of a spanner, and the end plate set screws 23 and 23' are loosened.

The tilt of the end plates 21, 22 is then adjusted by relative rotation of the wedge shaped discs 13, 14, 15 and 16 and the locking disc 26 is tightened up.

Orientation between top and bottom end plates can be adjusted by rotation of the ball and socket before the socket is tightened with the spanner.

The appropriate front and back and sideways position is adjusted by relative movement of the end plates 21 and 22 and the set screws 23 and 23' are tightened up.

We claim:
1. An alignment device for prostheses, comprising in combination:
   an upper plate member adapted to be attached to an upper portion of a prosthetic limb.
   a lower plate member adapted to be attached to a lower portion of a prosthetic limb,
   a stack of wedge members interposed between said plate members,
   a rod element projecting through said plate and wedge members, said rod element having a head at one end provided with a spherical surface engaging said upper plate and allowing said upper plate member to swivel with respect thereto,
   a clamp member adjustably mounted on the opposite end of said rod element having a spherical surface engaging said lower plate and allowing said lower plate to swivel with respect thereto,
   said upper and lower plate members having elongate slots receiving said rod element whereby said plate members may be shifted in planes normal to the axis of said rod element,
   said wedge members being relatively rotatable on said rod element to alter the angular relation of said plate members with respect to each other,
   and means for adjusting said clamp member on said opposite end of said rod element to clamp said plate members and said wedge members together in fixed position.

2. A prostheses alignment device having an upper plate adapted to be attached to the upper portion of a prosthetic limb, and a lower plate adapted to be attached to the lower portion of a prosthetic limb, said plates having a central post member extending therefrom with a ball and socket joint attached at each end of said post member for angularly adjusting each respective plate relative to the longitudinal axis of said post member, each ball of the respective ball and socket joints being provided with a threaded locking rod extending outwardly from the ball with one threaded rod being engaged in said upper plate and the other threaded rod being engaged in said lower plate, a plurality of wedge shaped discs rotatably mounted on each threaded locking rod between the respective balls and plates for selectively adjusting the angular position of said plates, and threaded locking discs respectively engaged with said locking rods and said ball and socket joints for locking the plates and wedge shaped discs in adjusted positions, the said discs constituting solid spacers maintaining the adjustment of said ball and socket joints.

References Cited

UNITED STATES PATENTS

| 2,481,823 | 9/1949 | Cejka | 174—138 XR |
| 3,273,168 | 9/1966 | Gardner et al. | 3—21 XR |

FOREIGN PATENTS

| 685,961 | 5/1964 | Canada. |
| 978,586 | 12/1964 | Great Britain. |
| 120,893 | 1959 | Russia. |

RICHARD A. GAUDET, *Primary Examiner.*

R. L. FRINKS, *Assistant Examiner.*

U.S. Cl. X.R.

3—21; 287—21